L. HAVERSTICK.
Grain-Lifter.
No. 215,354.  Patented May 13, 1879.
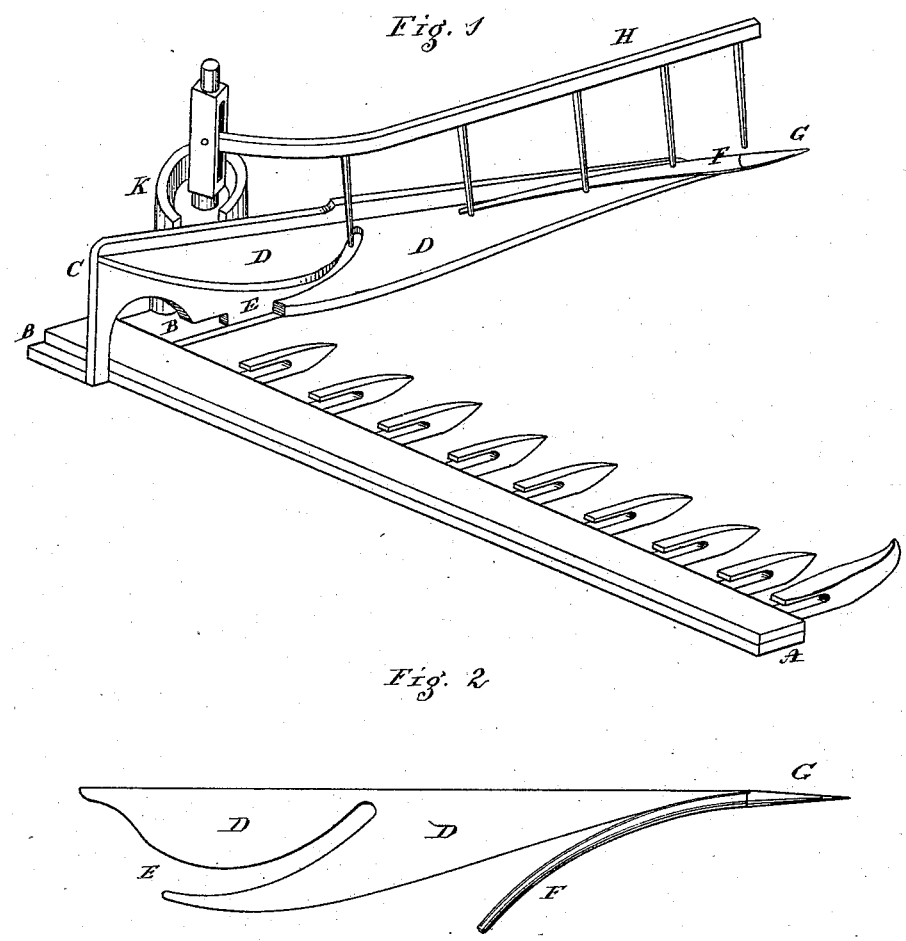

UNITED STATES PATENT OFFICE.

LEVI HAVERSTICK, OF WASHINGTON P. O., PENNSYLVANIA.

IMPROVEMENT IN GRAIN-LIFTERS.

Specification forming part of Letters Patent No. 215,354, dated May 13, 1879; application filed March 8, 1879.

*To all whom it may concern:*

Be it known that I, LEVI HAVERSTICK, of Washington P. O., in the county of Lancaster and State of Pennsylvania, have invented certain Improvements in Grain-Lifting Attachments to Harvesters, of which the following is a specification.

This invention relates to devices applied in advance of the sickles in harvesters for raising fallen or lodged grain, so as to prevent waste.

The accompanying drawings, with the letters of reference marked thereon, and a brief description, will enable those skilled in the art to make and use the same, in which—

Figure 1 represents an ordinary finger-bar, shoe, and revolving-rake mechanism, with my improved side table and lifter in place; Fig. 2, the lifter detached.

I claim no novelty in the revolving rake K I H, nor finger-bar A, which may be hinged or formed in the ordinary manner.

My improvement consists in attaching a table, D, against the inner side of a shoe or fender-board, C. This ledge or table has a curved slot, E, into which the first tooth of the rake H (in from the revolving shaft I) falls as it gathers the raised grain in sweeping over the lifter F, acting much like a reel, until it reaches the platform, to rake in the ordinary manner. The edge of this ledge or table D is a gradual wedge curve in form. The lifting-rod F is provided with a metallic point, G, and so adjusted as to be near the surface of the soil, while the rod with a gentle curve has its free end elevated and flared inward, so that when the machine moves forward the point gets under the lodged grain in advance of the sickles, and in its forward motion wedges the stalks upward. The edge of the ledge D sustains the grain in position until the rake in its regular revolution not only aids to bring it in proper position to the sickles, but to lodge it more uniformly upon the platform, and sweep it off, collected into a proper form for binding into sheaves. It also prevents a vexatious clogging in the angle of the hinged bar and raking attachment, around which the haulms are often lodged in a common class of reapers in use.

Having tested this arrangement last harvest, I wish to remark that it gave such marked satisfaction, and performed its functions so well, as to merit special attention.

I am aware that side rods have been tried with the same object in view, and revolving rods connected with the side board, C, direct, and not to a ledge or shelf, D.

I am not aware that a lifting-rod, in connection with a gathering-ledge, applied with its edge against the vertical fender, was ever before known or used.

What I deem new and useful in reaping-machines is—

The combination of the lifting-rod F with its point G, when attached to the apex of a horizontal shelf or ledge, D, provided with an open slot, E, and jointly attached to the ordinary vertical fender or board C, the whole arranged substantially as and for the purpose specified.

LEVI HAVERSTICK.

Witnesses:
ISRAEL F. GEHR,
J. S. SHUMAN.